US012209508B2

(12) United States Patent
Yamashita et al.

(10) Patent No.: US 12,209,508 B2
(45) Date of Patent: Jan. 28, 2025

(54) ROTARY MACHINE AND METHOD OF REPAIRING ROTARY MACHINE

(71) Applicant: MITSUBISHI HEAVY INDUSTRIES MARINE MACHINERY & EQUIPMENT CO., LTD., Nagasaki (JP)

(72) Inventors: Masato Yamashita, Tokyo (JP); Taiji Tezuka, Tokyo (JP); Kenji Yagi, Tokyo (JP); Yukihiro Iwasa, Nagasaki (JP); Yoshikazu Ito, Nagasaki (JP); Shingo Kanazawa, Nagasaki (JP)

(73) Assignee: MITSUBISHI HEAVY INDUSTRIES MARINE MACHINERY & EQUIPMENT CO., LTD., Nagasaki (JP)

( * ) Notice: Subject to any disclaimer, the term of this patent is extended or adjusted under 35 U.S.C. 154(b) by 0 days.

(21) Appl. No.: 18/026,966

(22) PCT Filed: Aug. 18, 2021

(86) PCT No.: PCT/JP2021/030267

§ 371 (c)(1),
(2) Date: Mar. 17, 2023

(87) PCT Pub. No.: WO2022/070654

PCT Pub. Date: Apr. 7, 2022

(65) Prior Publication Data

US 2023/0332515 A1 Oct. 19, 2023

(30) Foreign Application Priority Data

Sep. 30, 2020 (JP) ................................ 2020-165541

(51) Int. Cl.
*F01D 25/28* (2006.01)
*F01D 25/24* (2006.01)

(52) U.S. Cl.
CPC ............. *F01D 25/28* (2013.01); *F01D 25/24* (2013.01); *F05D 2220/40* (2013.01); *F05D 2230/80* (2013.01)

(58) Field of Classification Search
CPC ...... F01D 25/24; F01D 25/28; F05D 2220/40; F05D 2230/80; F05D 2260/31
See application file for complete search history.

(56) References Cited

U.S. PATENT DOCUMENTS

2002/0114693 A1* 8/2002 Bartholoma ............ F01D 25/24 415/196
2014/0056737 A1* 2/2014 Panambur ............... F01D 15/02 417/406

(Continued)

FOREIGN PATENT DOCUMENTS

CN 104421206 A * 3/2015 ........... F01D 25/243
EP 3009633 A1 4/2016

(Continued)

OTHER PUBLICATIONS

KR-20180072277-A (Jun. 2018; Kwak) English Translation (Year: 2023).*

(Continued)

*Primary Examiner* — David E Sosnowski
*Assistant Examiner* — Aye S Htay
(74) *Attorney, Agent, or Firm* — WHDA, LLP

(57) ABSTRACT

Provided is a supercharge including: an impeller; a scroll casing formed so as to surround the outer circumferential side of the impeller; a bearing casing arranged adjacent to the scroll casing; and coupling part that couples the scroll casing and the bearing casing to each other, the coupling part has a fastening bolt and a fastening bolt, a plurality of through holes are formed spaced apart from each other in the circumferential direction in the bearing casing, the scroll casing and the bearing casing are coupled to each other with (Continued)

a plurality of fastening bolt and a plurality of fastening bolt being inserted in the plurality of through hole, and the fastening bolt has higher tensile strength than the fastening bolt.

7 Claims, 7 Drawing Sheets

(56) References Cited

U.S. PATENT DOCUMENTS

| | | | |
|---|---|---|---|
| 2018/0066344 | A1 | 3/2018 | Matsumoto et al. |
| 2018/0223871 | A1 | 8/2018 | Makino et al. |

FOREIGN PATENT DOCUMENTS

| | | | | | |
|---|---|---|---|---|---|
| EP | 3163090 | A1 | | 5/2017 | |
| EP | 3173630 | A1 | * | 5/2017 | ............. F02B 39/00 |
| EP | 3 324 053 | A1 | | 5/2018 | |
| GB | 2414769 | A | | 12/2005 | |
| JP | 2005-344713 | A | | 12/2005 | |
| JP | 2005-351274 | A | | 12/2005 | |
| JP | 2007199024 | A | * | 8/2007 | |
| JP | 2015-063956 | A | | 4/2015 | |
| JP | 2016-050605 | A | | 4/2016 | |
| JP | 2016-084785 | A | | 5/2016 | |
| JP | 2016-186099 | A | | 10/2016 | |
| JP | 2018-084241 | A | | 5/2018 | |
| JP | 2018-123746 | A | | 8/2018 | |
| JP | 2020-016163 | A | | 1/2020 | |
| KR | 20180072277 | A | * | 6/2018 | |

OTHER PUBLICATIONS

JP-2007199024-A (Aug. 2007; Seguchi et al.) English Translation (Year: 2023).*

CN-104421206-A (Mar. 2005; Abiez) English Translation (Year: 2023).*

International Search Report dated Oct. 19, 2021, issued in counterpart Application No. PCT/JP2021/030267, with English Translation. (6 pages).

Written Opinion dated Oct. 19, 2021, issued in counterpart Application No. PCT/JP2021/030267, with English Translation. (9 pages).

Extended (Supplementary) European Search Report dated Dec. 20, 2023, issued in counterpart EP application No. 21874957.0. (8 pages).

* cited by examiner

ROTARY MACHINE AND METHOD OF REPAIRING ROTARY MACHINE

TECHNICAL FIELD

The present disclosure relates to a rotary machine and a method of repairing a rotary machine.

BACKGROUND ART

In rotary machines such as compressors or turbines, enhanced safety has been conventionally required so that, even when a rotor such as an impeller accommodated inside is damaged and broken, broken members do not scatter outside the device (for example, see Patent Literature 1). Patent Literature 1 discloses that a first casing forming a vortex chamber and a second casing arranged facing the first casing are fastened to each other by fastening members both on the outer circumferential side of the vortex chamber and on the inner circumferential side of the vortex chamber.

CITATION LIST

Patent Literature

[PTL 1]
Japanese Patent Application Laid-Open No. 2020-16163

SUMMARY OF INVENTION

Technical Problem

In the rotary machine disclosed in Patent Literature 1, with enhancement of the tensile strength of the fastening member, it is possible to enhance safety so that the broken members do not scatter outside the device. In a fastening member having high tensile strength (for example, a member called a high strength bolt or an ultrahigh strength bolt), however, it is known that a phenomenon called a delayed fracture may occur in which a steel material suddenly fractures after a predetermined period has elapsed after being subjected to a static stress.

Therefore, with enhancement of the tensile strength of the fastening member, it is possible to enhance safety so that broken members do not scatter to the outside, however, the fastening force between the first casing and the second casing may be reduced during normal use of a rotary machine due to a delayed fracture, or a coupling between the first casing and the second casing may be partially disconnected.

The present disclosure has been made in view of such circumstances and intends to provide a rotary machine and a method of repairing a rotary machine that can suppress a failure due to a delayed fracture of a fastening bolt while enhancing safety so that, even when an impeller accommodated inside is damaged and broken, the broken members do not scatter outside a device.

Solution to Problem

A rotary machine according to one aspect of the present disclosure is a rotary machine including: an impeller coupled to a rotary shaft configured to rotate about an axis; a first casing arranged along the axis and formed in an annular shape so as to surround an outer circumferential side of the impeller; a second casing arranged adjacent to the first casing along the axis and formed in an annular shape; and a coupling part configured to couple the first casing and the second casing to each other at a plurality of points in a circumferential direction about the axis at a predetermined position on the axis, the coupling part has at least one first fastening bolt formed in a shaft shape extending parallel to the axis and at least one second fastening bolt formed in a shaft shape extending parallel to the axis, a plurality of through holes each extending parallel to the axis are formed spaced apart from each other in the circumferential direction in at least one of the first casing and the second casing, the first casing and the second casing are coupled to each other with a plurality of first fastening bolts and a plurality of second fastening bolts being inserted in the plurality of through holes, and the first fastening bolt has higher tensile strength than the second fastening bolt.

A method of repairing a rotary machine according to one aspect of the present disclosure is a method of repairing a rotary machine, the rotary machine includes an impeller coupled to a rotary shaft configured to rotate about an axis, a first casing arranged along the axis and formed in an annular shape so as to surround an outer circumferential side of the impeller, and a second casing arranged adjacent to the first casing along the axis and formed in an annular shape, a plurality of through holes each extending parallel to the axis are formed spaced apart from each other in the circumferential direction in at least one of the first casing and the second casing, and the method includes: a removal step of removing at least one of a plurality of second fastening bolts that are inserted in the plurality of through hole and couple the first casing and the second casing to each other; and a coupling step of inserting a first fastening bolt in the through hole from which the second fastening bolt was removed and coupling the first casing and the second casing to each other, and the first fastening bolt has higher tensile strength than the second fastening bolt.

Advantageous Effects of Invention

According to the present disclosure, it is possible to provide a rotary machine and a method of repairing a rotary machine that can suppress a failure due to a delayed fracture of a fastening bolt while enhancing safety so that, even when the impeller accommodated inside is damaged and broken, the broken members do not scatter outside the device.

DESCRIPTION OF EMBODIMENTS

First Embodiment

Figure 1:
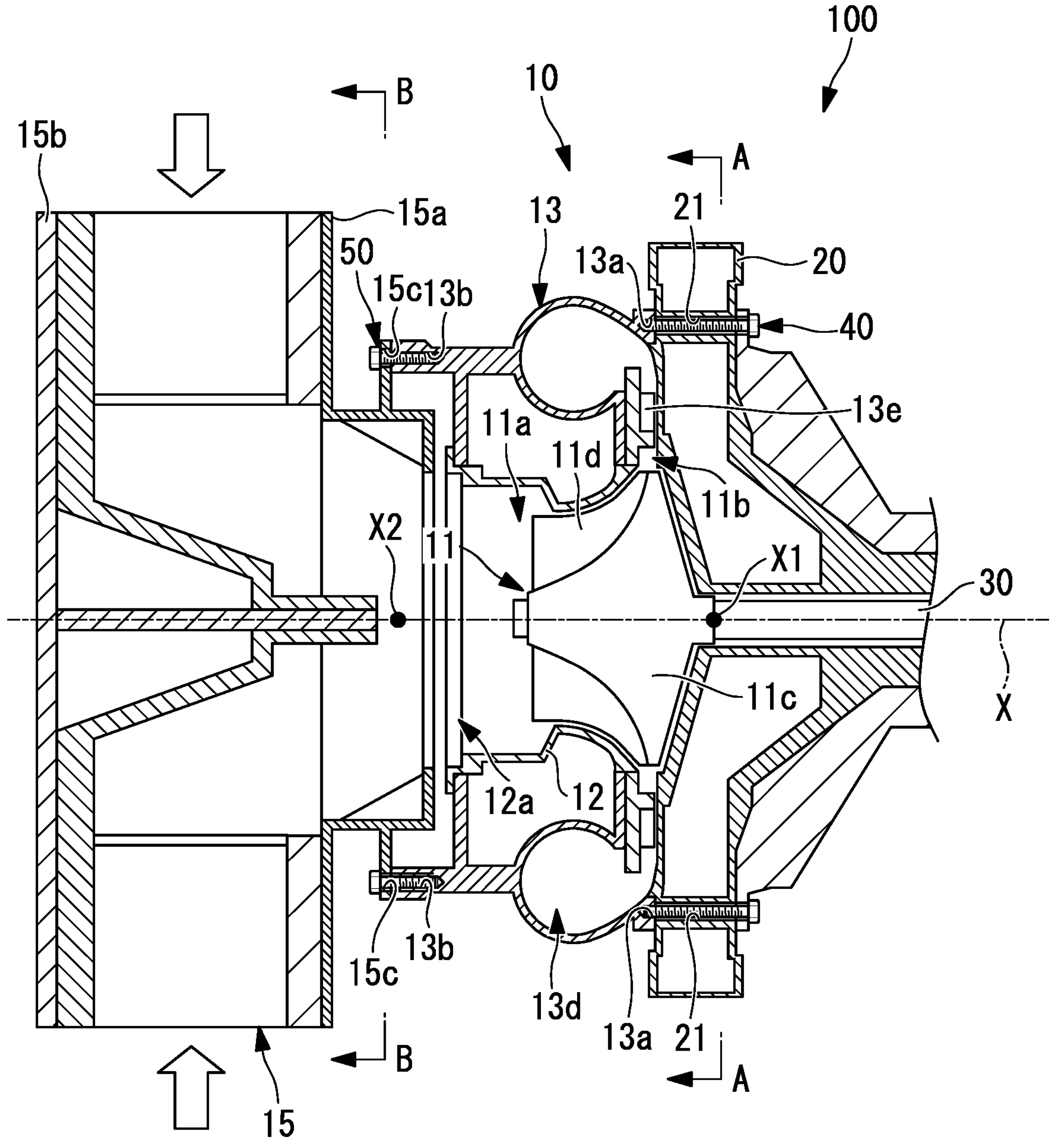
FIG. 1 is a longitudinal sectional view illustrating a supercharger according to a first embodiment of the present disclosure.
Figure 2:
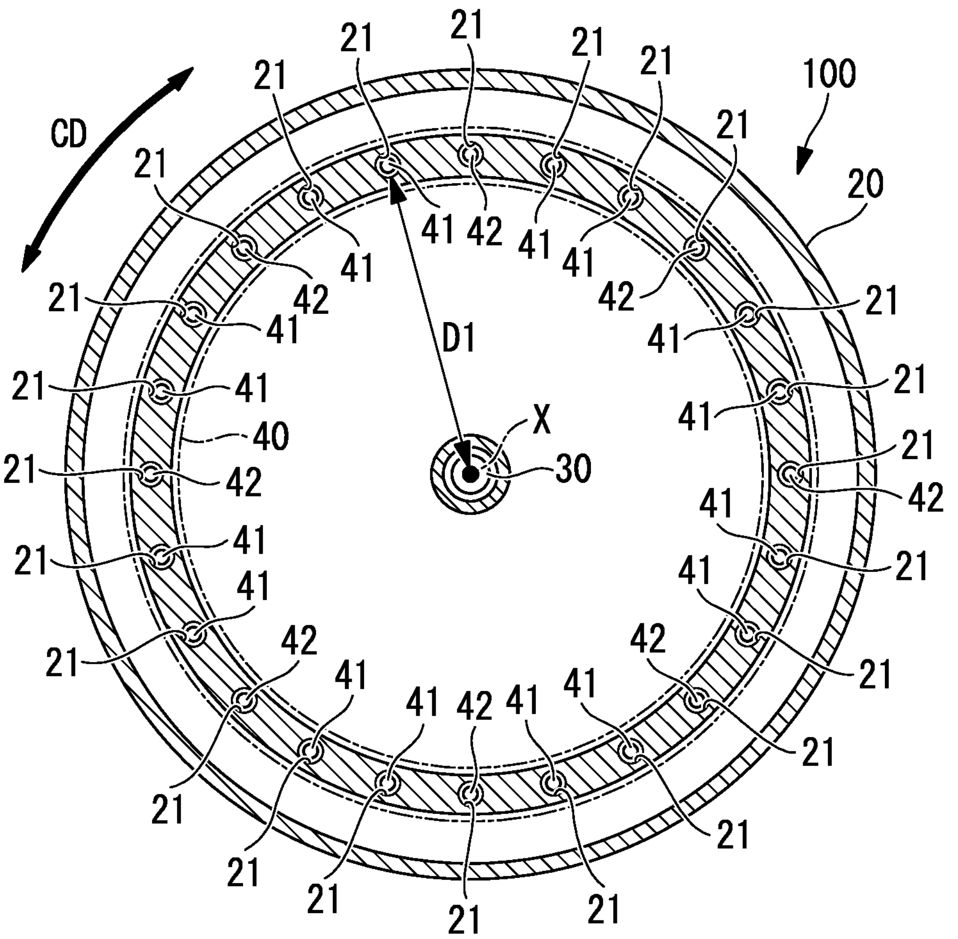
FIG. 2 is an end view from an arrow A-A of the supercharger illustrated in FIG. 1.
Figure 3:
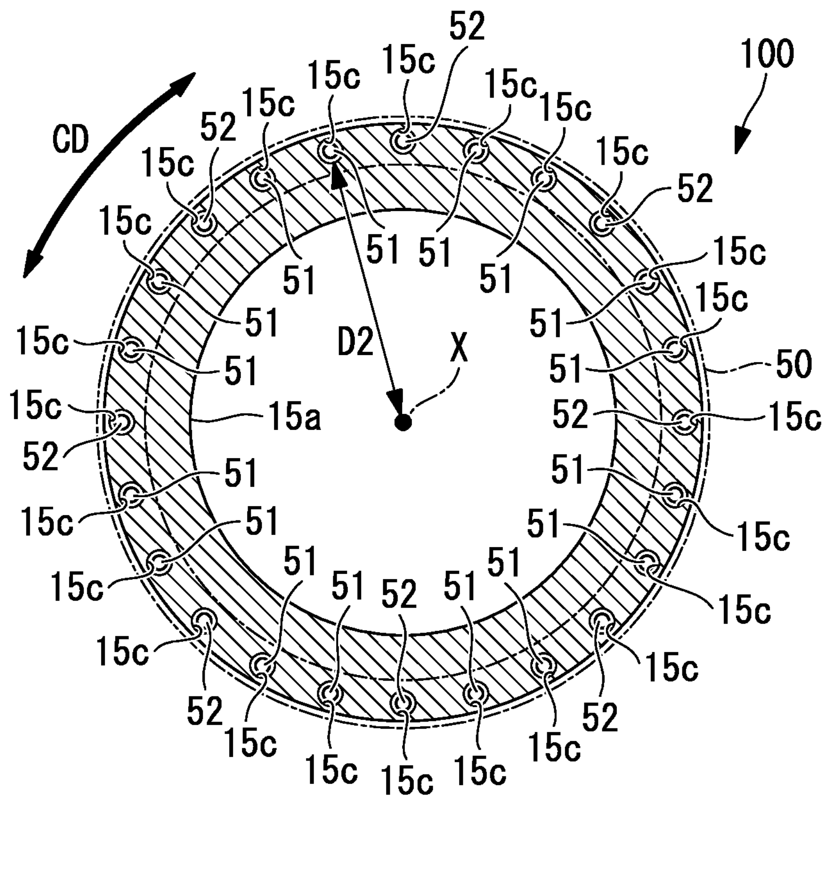
FIG. 3 is an end view from an arrow B-B of the supercharger illustrated in FIG. 1.

A supercharger (a compressor; a rotary machine) 100 according to a first embodiment of the present disclosure will be described below with reference to the drawings. FIG. 1 is a longitudinal sectional view illustrating the supercharger 100 according to the present embodiment. FIG. 2 is an end view from the arrow A-A of the supercharger 100 illustrated in FIG. 1. FIG. 3 is an end view from the arrow B-B of the supercharger 100 illustrated in FIG. 1.

The supercharger 100 of the present embodiment is a device that compresses an intake gas (for example, air) and delivers the compressed gas into an internal-combustion engine. As illustrated in FIG. 1, the supercharger 100 of the present embodiment includes a turbine (not illustrated), a centrifugal compressor 10, a silencer 15 (sound absorbing device), and a bearing casing (second casing) 20. The turbine and the centrifugal compressor 10 are coupled to a rotor shaft 30, respectively. The rotor shaft 30 is supported rotatably about an axis X by the bearing casing 20.

The turbine (not illustrated) has a turbine disk (not illustrated) to which turbine blades are attached and which is coupled to the rotor shaft 30. The turbine disk is rotated about the axis X by an exhaust gas discharged from the internal-combustion engine and guided to the turbine blades. In response to rotation of the turbine disk about the axis X, the rotor shaft 30 to which the turbine disk is coupled is rotated about the axis X.

The centrifugal compressor 10 is a device that compresses air flowing therein from outside of the supercharger 100 and supplies the compressed air (hereafter, referred to as compressed air) to a scavenging trunk (not illustrated) in communication with the inside of the cylinder liner (not illustrated) forming the internal-combustion engine. The centrifugal compressor 10 includes an impeller 11, a guide cylinder 12, and a scroll casing (first casing) 13.

As illustrated in FIG. 1, the impeller 11 is coupled to the rotor shaft 30 extending along the axis X and is rotated about the axis X in response to rotation of the rotor shaft 30 about the axis X. The impeller 11 rotates about the axis X, thereby compresses air flowing therein from the intake port 11*a*, and discharges the compressed air from a discharge port 11*b*.

As illustrated in FIG. 1, the impeller 11 includes a hub 11*c* attached to the rotor shaft 30 and blades 11*d* attached to the outer circumferential face of the hub 11*c*. The impeller 11 is provided with a space defined by the outer circumferential face of the hub 11*c* and the inner circumferential face of the guide cylinder 12, and this space is partitioned into a plurality of spaces by a plurality of blades 11*d*. The impeller 11 provides work to air flowing therein along the axis X direction from the intake port 11*a* to discharge the air in a radial direction orthogonal to the axis X direction and causes the compressed air discharged from the discharge port 11*b* to flow into a diffuser 13*e*.

The guide cylinder 12 is a cylindrical member that accommodates the impeller 11 about the axis X and discharges air flowing therein along the axis X from an inlet port 12*a*, out of the discharge port 11*b*. Together with the impeller 11, the guide cylinder 12 directs the air, which flows therein along the axis X from the intake port 11*a*, in the radial direction orthogonal to the axis X and guides the directed air to the discharge port 11*b*.

The scroll casing 13 is a device into which compressed air discharged from the discharge port 11*b* flows and which converts kinetic energy (dynamic pressure) applied to the compressed air into pressure energy (static pressure). The scroll casing 13 is arranged on the outer circumferential side from the guide cylinder 12 in the radial direction orthogonal to the axis X direction. The scroll casing 13 is arranged along the axis X and formed in an annular shape so as to surround the outer circumferential side of the impeller 11.

As illustrated in FIG. 1, the diffuser 13*e* is attached to the scroll casing 13. The diffuser 13*e* is a wing-shaped member arranged downstream of the discharge port 11*b* of the impeller 11 and forms a channel that guides compressed air from the discharge port 11*b* to the vortex chamber 13*d*. The diffuser 13*e* is provided so as to surround the discharge port 11*b* for the compressed air provided to the entire circumference of the impeller 11.

The diffuser 13*e* reduces the flow velocity of compressed air discharged from the discharge port 11*b* of the impeller 11 and thereby converts kinetic energy (dynamic pressure) applied to the compressed air into pressure energy (static pressure). The compressed air reduced in the flow velocity when passing through the diffuser 13*e* flows into the vortex chamber 13*d* in communication with the diffuser 13*e*. The compressed air that has flown into the vortex chamber 13*d* is discharged to a discharge pipe (not illustrated).

The bearing casing 20 is a member formed in an annular shape about the axis X and arranged adjacent to the scroll casing 13 along the axis X. The bearing casing 20 is coupled to the scroll casing 13 by a coupling part 40.

As illustrated in FIG. 1, the coupling part 40 is to couple the scroll casing 13 and the bearing casing 20 to each other at a plurality of points at a position X1 on the axis X in the circumferential direction CD about the axis X. As illustrated in FIG. 2, the coupling part 40 has fastening bolts (first fastening bolt) 41 each formed in a shaft shape extending parallel to the axis X and fastening bolts (second fastening bolt) 42 each formed in a shaft shape extending parallel to the axis X. An external thread is formed in each outer circumferential face of the fastening bolts 41 and the fastening bolts 42.

The fastening bolts 41 and the fastening bolts 42 have the same length and the same outer diameter. However, the tensile strength of the fastening bolt 41 is higher than the tensile strength of the fastening bolt 42. It is desirable that that the tensile strength of the fastening bolt 41 be strength that can ensure safety so that, even when the impeller 11 is damaged and broken, the broken members do not scatter outside the supercharger 100.

It is desirable that the tensile strength of the fastening bolt 41 be higher than or equal to 1200 MPa ($N/mm^2$), for example. As a fastening bolt having tensile strength of 1200 MPa ($N/mm^2$) or higher, a 12G hot dip galvanizing high strength bolt "12G SHTB (registered trademark)" can be used, for example. Further, for example, a bolt formed of YAG300 (maraging steel) can be employed. It is more preferable that the yield strength of the fastening bolt 41 be higher than or equal to 1080 MPa ($N/mm^2$). It is desirable that the tensile strength of the fastening bolt 42 be strength at which a delayed fracture is less likely to occur, for example, be lower than or equal to 1100 MPa ($N/mm^2$).

In the bearing casing 20, a plurality of through holes 21 each extending parallel to the axis X are formed spaced apart from each other in the circumferential direction CD. Fastening holes 13*a* each extending parallel to the axis X are formed in the end face of the scroll casing 13 arranged facing the through holes 21. An internal thread is formed in each inner circumferential face of the fastening holes 13*a*.

The scroll casing 13 and the bearing casing 20 are coupled to each other with the plurality of fastening bolts 41 and the plurality of fastening bolts 42 being inserted in the plurality of through holes 21. The scroll casing 13 and the bearing casing 20 are coupled to each other by engaging each of the external threads formed in the outer circumferential faces of the fastening bolts 41 and the fastening bolts 42 with each of the internal threads formed in the inner circumferential faces of the fastening holes 13*a*.

As illustrated in FIG. 2, the plurality of through holes 21 are arranged such that respective distances from the plurality of through holes 21 to the axis X are the same distance D1. The plurality of through holes 21 illustrated in FIG. 2 are arranged at 24 points at an interval of 15 degrees in the circumferential direction CD about the axis X. Note that the number of points at which the plurality of through holes 21 are arranged in the circumferential direction CD may be any number other than 24.

As illustrated in FIG. 2, the fastening bolts 42 are inserted at 4 out of 24 of the through holes 21. The through holes 21 in which the fastening bolts 42 are inserted are arranged at 8 points at an interval of 45 degrees in the circumferential direction. On the other hand, the fastening bolts 41 having higher tensile strength than the fastening bolts 42 are inserted in 20 out of 24 of the through holes 21. The fastening bolts 41 are inserted in other through holes 21 than the four through holes 21 in which the fastening bolts 42 are inserted.

Although the fastening bolts 42 are inserted at 4 out of 24 of the through holes 21 and the fastening bolts 41 are inserted at 20 out of 24 of the through holes 21 in the example illustrated in FIG. 2, other forms may be employed. For example, the number of through holes used for insertion of the fastening bolts 42 may be 8 or 12, and the fastening bolts 41 may be inserted in the remaining through holes.

In such a case, it is preferable that the position at which the through holes 21 used for insertion of the fastening bolts 42 are arranged be positions symmetrical with respect to the axis X. Further, it is preferable that the positions at which the through holes 21 used for insertion of the fastening bolts 42 are arranged be positions at the same interval in the circumferential direction CD. Further, it is preferable that the number of fastening bolts 41 inserted in a plurality of through holes 21 be greater than the number of fastening bolts 42 inserted in a plurality of through holes 21.

The silencer 15 (sound absorbing device) is a device that absorbs sound of a part of noise occurring from the centrifugal compressor 10 and reduces the noise level. The silencer 15 is attached to the inlet port 12*a* of the guide cylinder 12 of the centrifugal compressor 10. The silencer 15 redirects the flow direction of air flowing therein from outside in the radial direction along the arrow illustrated in FIG. 1 to a direction along the axis X and guides the air to the inlet port 12*a* of the guide cylinder 12.

The silencer 15 includes a silencer casing (second casing) 15*a* and a silencer casing 15*b*. The silencer casing 15*a* and the silencer casing 15*b* are arranged spaced apart from each other along the axis X, and a channel through which air flows is formed between the silencer casing 15*a* and the silencer casing 15*b*.

The silencer casing 15*a* is a member formed in an annular shape about the axis X and is arranged adjacent to the scroll casing 13 along the axis X. The silencer casing 15*a* is coupled to the scroll casing 13 by a coupling part 50.

As illustrated in FIG. 1, the coupling part 50 is to couple the scroll casing 13 and the silencer casing 15*a* to each other at a plurality of points at a position X2 on the axis X in the circumferential direction CD about the axis X. As illustrated in FIG. 3, the coupling part 50 has fastening bolts (first fastening bolt) 51 each formed in a shaft shape extending parallel to the axis X and fastening bolts (second fastening bolt) 52 each formed in a shaft shape extending parallel to the axis X. An external thread is formed in each outer circumferential face of the fastening bolts 51 and the fastening bolts 52.

The fastening bolts 51 and the fastening bolts 52 have the same length and the same outer diameter. However, the tensile strength of the fastening bolt 51 is higher than the tensile strength of the fastening bolt 52. It is desirable that that the tensile strength of the fastening bolt 51 have strength that can ensure safety so that, even when the impeller 11 is damaged and broken, the broken members do not scatter outside the supercharger 100.

It is desirable that the tensile strength of the fastening bolt 51 be higher than or equal to 1200 MPa ($N/mm^2$), for example. As a fastening bolt having tensile strength of 1200 MPa ($N/mm^2$) or higher, a 12G hot dip galvanizing high strength bolt "12G SHTB (registered trademark)" can be used, for example. Further, for example, a bolt formed of YAG300 (maraging steel) can be employed. It is more preferable that the yield strength of the fastening bolt 51 be higher than or equal to 1080 MPa ($N/mm^2$). It is desirable that the tensile strength of the fastening bolt 52 be strength at which a delayed fracture is less likely to occur, for example, be lower than or equal to 1100 MPa ($N/mm^2$).

In the silencer casing 15*a*, a plurality of through holes 15*c* each extending parallel to the axis X are formed spaced apart from each other in the circumferential direction CD. Fastening holes 13*b* each extending parallel to the axis X are formed in the end face of the scroll casing 13 arranged facing the through holes 15*c*. An internal thread is formed in each inner circumferential face of the fastening holes 13*b*.

The scroll casing 13 and the silencer casing 15*a* are coupled to each other with the plurality of fastening bolts 51 and the plurality of fastening bolts 52 being inserted in the plurality of through holes 15*c*. The scroll casing 13 and the silencer casing 15*a* are coupled to each other by engaging each of the external threads formed in the outer circumferential faces of the fastening bolts 51 and the fastening bolts 52 with each of the internal threads formed in the inner circumferential faces of the fastening holes 13*b*.

As illustrated in FIG. 3, the plurality of through holes 15*c* are arranged such that respective distances from the plurality of through holes 15*c* to the axis X are the same distance D2. The plurality of through holes 15*c* illustrated in FIG. 3 are arranged at 24 points at an interval of 15 degrees in the circumferential direction CD about the axis X. Note that the number of points at which the plurality of through holes 15*c* are arranged in the circumferential direction CD may be any number other than 24.

As illustrated in FIG. 3, the fastening bolts 52 are inserted at 4 out of 24 of the through holes 15*c*. The through holes 15*c* in which the fastening bolts 52 are inserted are arranged at 8 points at an interval of 45 degrees in the circumferential direction. On the other hand, the fastening bolts 51 having higher tensile strength than the fastening bolts 52 are inserted in 20 out of 24 of the through holes 15*c*. The fastening bolts 51 are inserted in other through holes 15*c* than the four through holes 15*c* in which the fastening bolts 52 are inserted.

Although the fastening bolts 52 are inserted at 4 out of 24 of the through holes 15*c* and the fastening bolts 51 are inserted at 20 out of 24 of the through holes 15*c* in the example illustrated in FIG. 3, other forms may be employed. For example, the number of through holes used for insertion of the fastening bolts 52 may be 8 or 12, and the fastening bolts 51 may be inserted in the remaining through holes.

In such a case, it is preferable that the position at which the through holes 15*c* used for insertion of the fastening bolts 52 are arranged be positions symmetrical with respect to the axis X. Further, it is preferable that the positions at which the through holes 15*c* used for insertion of the fastening bolts 52 are arranged be positions at the same interval in the circumferential direction CD. Further, it is preferable that the number of fastening bolts 51 inserted in a plurality of through holes 15*c* be greater than the number of fastening bolts 52 inserted in a plurality of through holes 15*c*.

Figure 4:
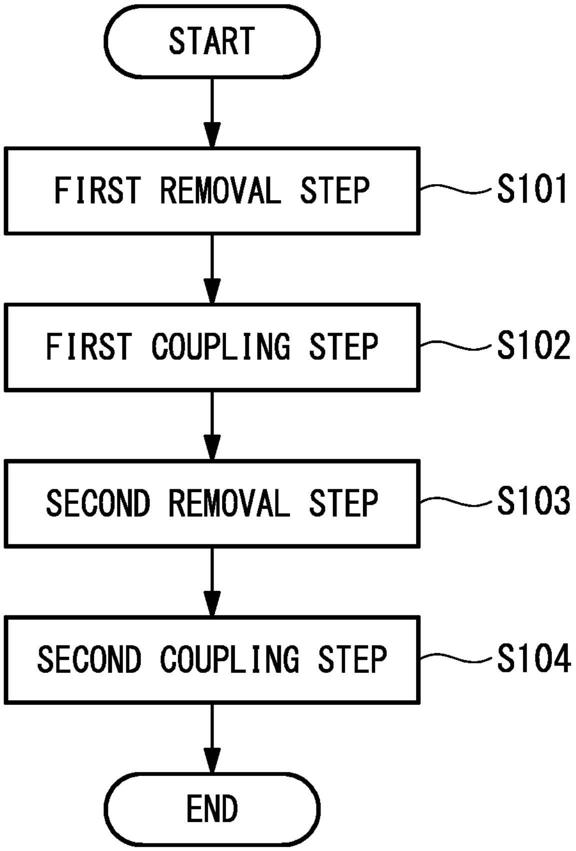
FIG. 4 is a flowchart illustrating a method of repairing the supercharger according to the first embodiment of the present disclosure.

Next, a method of repairing the supercharger 100 of the present embodiment will be described with reference to the drawings. FIG. 4 is a flowchart illustrating the method of repairing the supercharger 100 of the present embodiment.

The repairment method of the present embodiment is a method of repairing the supercharger 100 in which the scroll casing 13 and the bearing casing 20 are fastened to each other by only the fastening bolts 42 and, also, the scroll casing 13 and the silencer casing 15*a* are fastened to each other by only the fastening bolts 52.

It is assumed that, in the supercharger 100 before the repairment method illustrated in FIG. 4 is performed, the scroll casing 13 and the bearing casing 20 are fastened to each other by only the fastening bolts 42, and the scroll casing 13 and the silencer casing 15*a* are fastened to each other by only the fastening bolts 52.

In step S101 (first removal step) of FIG. 4, an operator removes at least one of the fastening bolts 42 that have been inserted in the through holes 21. Each fastening bolts 42 is a bolt that is inserted in the through hole 21 and couples the scroll casing 13 and the bearing casing 20 to each other. For example, the operator removes 20 fastening bolts 42 that have been inserted in the positions of the fastening bolts 41 illustrated in FIG. 2.

In step S102 (first coupling step), the operator inserts the fastening bolts 41 in the through holes 21 from which the fastening bolts 42 were removed and fastens these fastening bolts 41 to the fastening holes 13*a* of the scroll casing 13 to couple the scroll casing 13 and the bearing casing 20 to each other.

In step S103 (second removal step), the operator removes at least one of the fastening bolts 52 that have been inserted in the through holes 15*c*. Each fastening bolts 52 is a bolt that is inserted in the through hole 15*c* and couples the scroll casing 13 and the silencer casing 15*a* to each other. For example, the operator removes 20 fastening bolts 52 that have been inserted in the positions of the fastening bolts 51 illustrated in FIG. 3.

In step S104 (second coupling step), the operator inserts the fastening bolts 51 in the through holes 15*c* from which the fastening bolts 52 were removed and fastens these fastening bolts 51 to the fastening holes 13*b* of the scroll casing 13 to couple the scroll casing 13 and the silencer casing 15*a* to each other.

With the above steps, repairment is performed on the supercharger 100 in which the scroll casing 13 and the bearing casing 20 are fastened to each other by only the fastening bolts 42 and, also, the scroll casing 13 and the silencer casing 15*a* are fastened to each other by only the fastening bolts 52. In the repaired supercharger 100, the scroll casing 13 and the bearing casing 20 are fastened by both the plurality of fastening bolts 41 and the plurality of fastening bolts 42. Further, in the repaired supercharger 100, the scroll casing 13 and the silencer casing 15*a* are fastened by both the plurality of fastening bolts 51 and the plurality of fastening bolts 52.

Although the fastening bolts 41 and the fastening bolts 42 are fastened to the fastening hole 13*a* formed in the scroll casing 13 in the above description, other forms may be employed. For example, through holes in which the fastening bolts 41 and the fastening bolts 42 are inserted may be provided in the scroll casing 13. In such a case, the scroll casing 13 and the bearing casing 20 are coupled to each other by fastening nuts to the fastening bolts 41 and the fastening bolts 42 passed through the through holes.

Further, although the fastening bolts 51 and the fastening bolts 52 are fastened to the fastening hole 13*b* formed in the scroll casing 13 in the above description, other forms may be employed. For example, through holes in which the fastening bolts 51 and the fastening bolts 52 are inserted may be provided in the scroll casing 13. In such a case, the scroll casing 13 and the silencer casing 15*a* are coupled to each other by fastening nuts to the fastening bolts 51 and the fastening bolts 52 passed through the through holes.

The supercharger 100 of the present embodiment described above achieves the following effects and advantages.

According to the supercharger 100 of the present embodiment, the coupling part 40 that couples the scroll casing 13, which is formed in an annular shape so as to surround the outer circumferential side of the impeller 11, and the bearing casing 20, which is arranged adjacent to the scroll casing 13, to each other has the fastening bolts 41 and the fastening bolts 42 each formed in a shaft shape extending parallel to the axis X. The scroll casing 13 and the bearing casing 20 are coupled to each other with a plurality of fastening bolts 41 and a plurality of fastening bolts 42 being inserted in the plurality of through holes 21.

According to the supercharger 100 of the present disclosure, the fastening bolt 41 has higher tensile strength than the fastening bolt 42. Thus, compared to a case where only the fastening bolts 42 are used to couple the scroll casing 13 and the bearing casing 20 to each other, it is possible to increase the coupling strength of coupling between the scroll casing 13 and the bearing casing 20 and enhance safety so that, even when the impeller 11 accommodated inside is damaged and broken, the broken members do not scatter outside the device.

Further, according to the supercharger 100 of the present embodiment, the fastening bolt 42 has lower tensile strength than the fastening bolt 41. Thus, compared to a case where only the fastening bolts 41 are used to couple the scroll casing 13 and the bearing casing 20 to each other, it is possible to suppress a failure due to a delayed fracture of the fastening bolt 41. That is, even when the fastening bolt 41 is broken due to a delayed fracture, the state where the scroll casing 13 and the bearing casing 20 are coupled to each other can be maintained by the fastening bolt 42.

Further, according to the supercharger 100 of the present embodiment, by setting the number of fastening bolts 41 having higher tensile strength than the fastening bolt 42 to be greater than the number of fastening bolts 42, it is possible to sufficiently enhance safety so that, even when the impeller 11 accommodated inside is damaged and broken, the broken members do not scatter outside the device.

Further, according to the supercharger 100 of the present embodiment, since a plurality of through holes 21 are arranged so as to have the same distance to the axis X, the coupling strength between the scroll casing 13 and the bearing casing 20 at each position in the circumferential direction CD about the axis X can be made even.

Further, according to the supercharger 100 of the present embodiment, since the fastening bolts 41 and the fastening bolts 42 have the same length and the same outer diameter, it is possible to make the plurality of through holes 21 have the same length and the same inner diameter. It is thus possible to reduce man-hour required for forming the plurality of through holes 21.

The method of repairing the supercharger 100 of the present embodiment described above achieves the following effects and advantages.

According to the method of repairing the supercharger 100 of the present embodiment, in the first removal step, at least one of the plurality of fastening bolts 42 that couple the scroll casing 13, which is formed in an annular shape so as to surround the outer circumferential side of the impeller 11, and the bearing casing 20, which is arranged adjacent to the scroll casing 13, to each other is removed. Then, in the first coupling step, the fastening bolt 41 is inserted in the through hole 21 from which the fastening bolt 42 was removed, and thereby the scroll casing 13 and the bearing casing 20 are coupled to each other.

According to the method of repairing the supercharger 100 of the present embodiment, the fastening bolt 41 has higher tensile strength than the fastening bolt 42. Thus, compared to a case where only the fastening bolts 42 are used to couple the scroll casing 13 and the bearing casing 20 to each other, it is possible to increase the coupling strength of coupling between the scroll casing 13 and the bearing casing 20 and enhance safety so that, even when the impeller 11 accommodated inside is damaged and broken, the broken members do not scatter outside the device.

Further, according to the method of repairing the supercharger 100 of the present embodiment, the fastening bolt 42 has lower tensile strength than the fastening bolt 41. Thus, compared to a case where only the fastening bolts 41 are used to couple the scroll casing 13 and the bearing casing 20 to each other, it is possible to suppress a failure due to a delayed fracture of the fastening bolt. That is, even when the fastening bolt 41 is broken due to a delayed fracture, the state where the scroll casing 13 and the bearing casing 20 are coupled to each other can be maintained by the fastening bolts 42.

Second Embodiment

Figure 5:
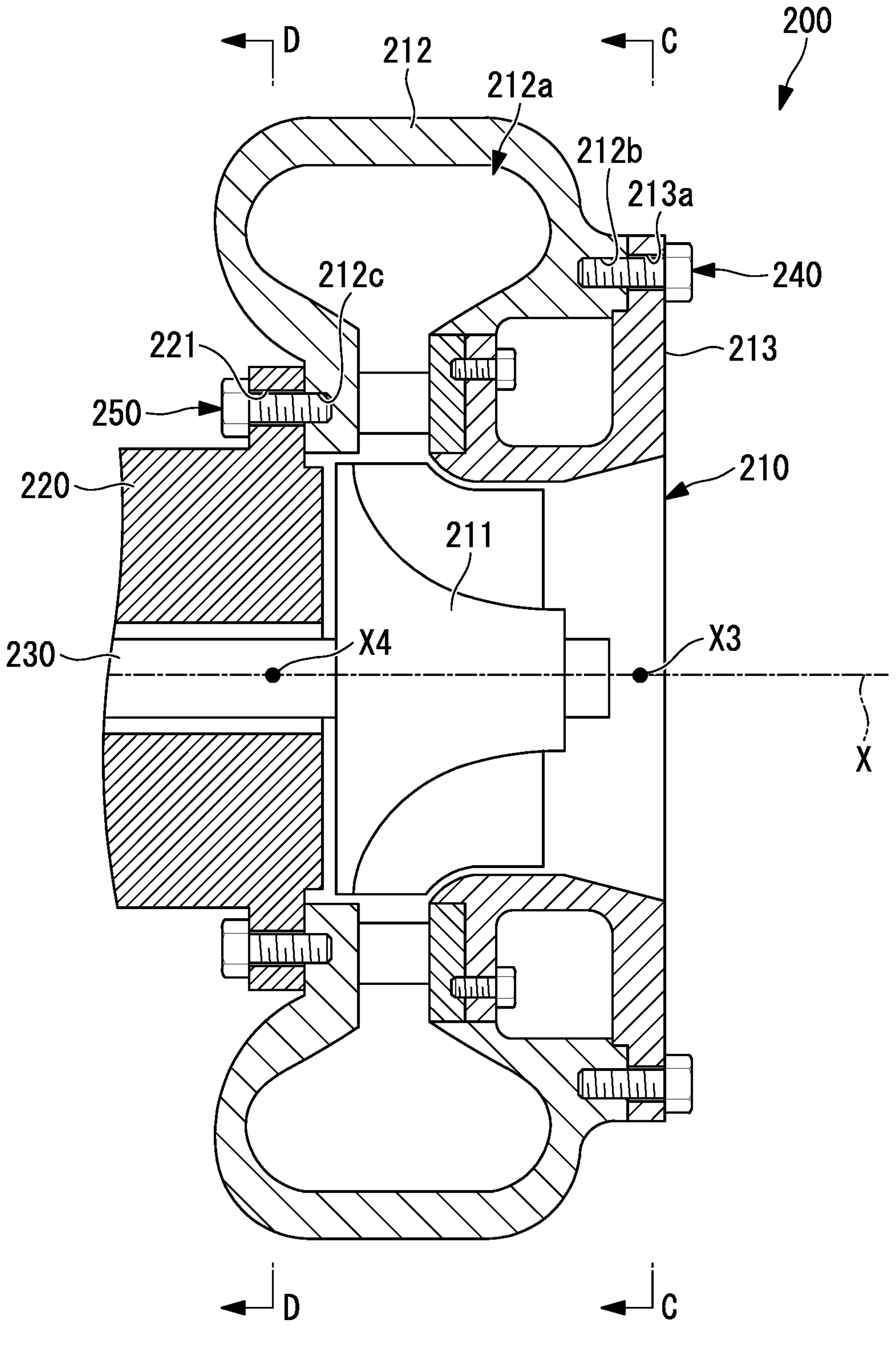
FIG. 5 is a longitudinal sectional view illustrating a supercharger according to a second embodiment of the present disclosure.
Figure 6:
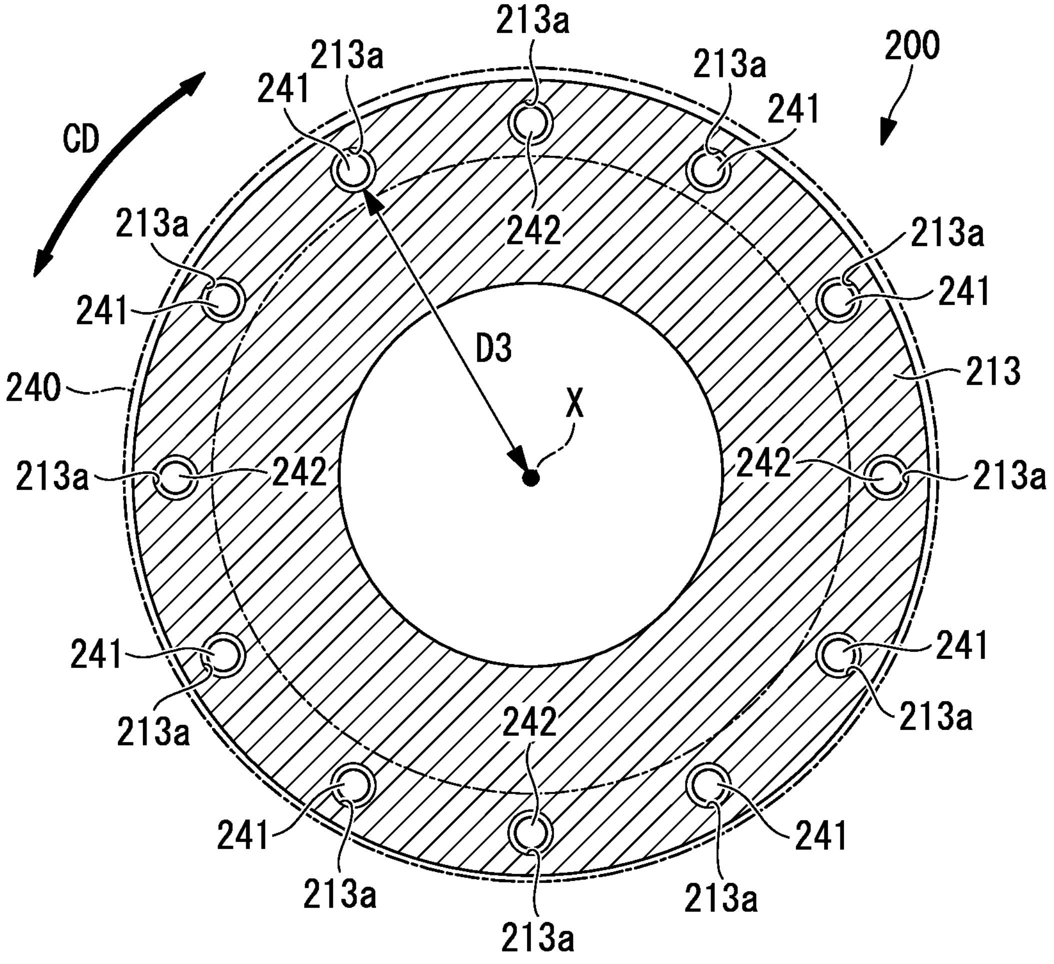
FIG. 6 is an end view from an arrow C-C of the supercharger illustrated in FIG. 5.
Figure 7:
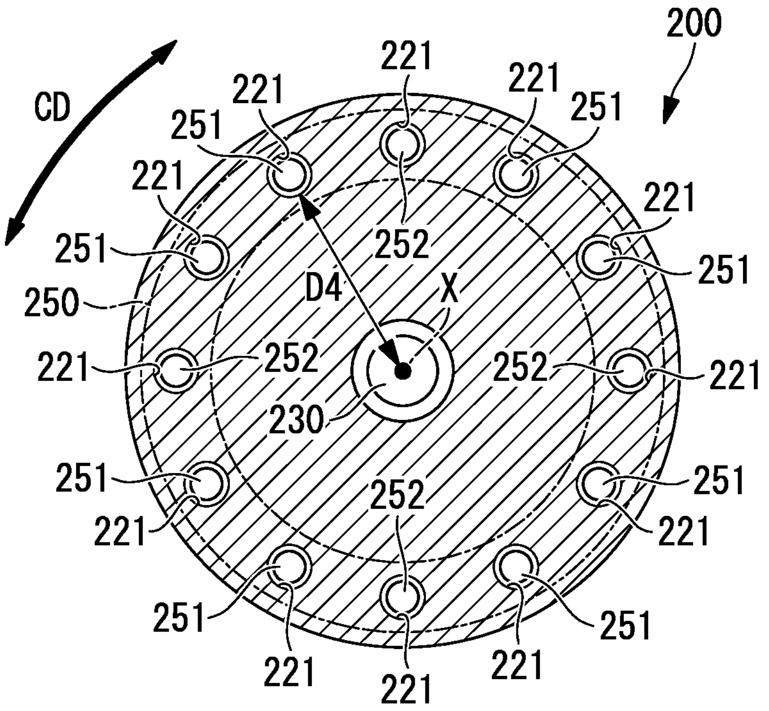
FIG. 7 is an end view from an arrow D-D of the supercharger illustrated in FIG. 5.

Next, a supercharger 200 according to a second embodiment of the present disclosure will be described with reference to the drawings. FIG. 5 is a longitudinal sectional view illustrating the supercharger 200 according to the present embodiment. FIG. 6 is an end view from an arrow C-C of the supercharger 200 illustrated in FIG. 5. FIG. 7 is an end view from an arrow D-D of the supercharger 200 illustrated in FIG. 5.

The supercharger 200 of the present embodiment is a device that compresses an intake gas (for example, air) and delivers the compressed gas into an internal-combustion engine. As illustrated in FIG. 5, the supercharger 200 of the present embodiment includes a turbine 210, a compressor (not illustrated), and a bearing casing (second casing) 220. The turbine 210 and the compressor are coupled to a rotor shaft 230, respectively. The rotor shaft 230 is supported rotatably about the axis X by the bearing casing 20.

The turbine 210 includes an impeller 211 to which turbine blades are attached, a turbine casing (first casing) 212 that accommodates the impeller 211 inside, and an outlet casing (second casing) 213.

Driving force is applied to the impeller 211, which is rotated about the axis X by a gas flowing therein from the vortex chamber **212*a* of the turbine casing 212 (for example, an exhaust gas discharged from the internal-combustion engine). The rotor shaft 230 is rotated about the axis X by driving force applied to the impeller 211, and the compressor coupled thereto via the rotor shaft 230** is rotated.

The turbine casing 212 has a vortex chamber **212*a* that accommodates the impeller 211 inside and into which a gas flows from the internal-combustion engine. The turbine casing 212 is arranged along the axis X and formed in an annular shape so as to surround the outer circumferential side of the impeller 211**.

The outlet casing 213 forms a channel for discharging a gas flowing into the impeller 211 from the vortex chamber **212*a*. The outlet casing 213 is a member formed in an annular shape about the axis X and is arranged adjacent to the turbine casing 212 along the axis X. The outlet casing 213 is coupled to the turbine casing 212 by a coupling part 240**.

As illustrated in FIG. 5, the coupling part 240 is to couple the turbine casing 212 and the outlet casing 213 to each other at a plurality of points at a position X3 on the axis X in the circumferential direction CD about the axis X. As illustrated in FIG. 6, the coupling part 240 has fastening bolts (first fastening bolt) 241 each formed in a shaft shape extending parallel to the axis X and fastening bolts (second fastening bolt) 242 each formed in a shaft shape extending parallel to the axis X. An external thread is formed in each outer circumferential face of the fastening bolts 241 and the fastening bolts 242.

The fastening bolts 241 and the fastening bolts 242 have the same length and the same outer diameter. However, the tensile strength of the fastening bolt 241 is higher than the tensile strength of the fastening bolt 242. It is desirable that the tensile strength of the fastening bolt 241 have strength that can ensure safety so that, even when the impeller 211 is damaged and broken, the broken members do not scatter outside the supercharger 200.

It is desirable that the tensile strength of the fastening bolt 241 be higher than or equal to 1200 MPa ($N/mm^2$), for example. As a fastening bolt having tensile strength of 1200 MPa ($N/mm^2$) or higher, a 12G hot dip galvanizing high strength bolt "12G SHTB (registered trademark)" can be used, for example. Further, for example, a bolt formed of YAG300 (maraging steel) can be employed. It is more preferable that the yield strength of the fastening bolt 241 be higher than or equal to 1080 MPa ($N/mm^2$). It is desirable that the tensile strength of the fastening bolt 242 be strength at which a delayed fracture is less likely to occur, for example, be lower than or equal to 1100 MPa ($N/mm^2$).

In the outlet casing 213, a plurality of through holes **213*a* each extending parallel to the axis X are formed spaced apart from each other in the circumferential direction CD. Fastening holes 212*b* each extending parallel to the axis X are formed in the end face of the turbine casing 212 arranged facing the through holes 213*a*. An internal thread is formed in each inner circumferential face of the fastening holes 212*b***.

The turbine casing 212 and the outlet casing 213 are coupled to each other with the plurality of fastening bolts 241 and the plurality of fastening bolts 242 being inserted in the plurality of through holes **213*a*. The turbine casing 212** and the outlet casing 213 are coupled to each other by engaging each of the external threads formed in the outer circumferential faces of the fastening bolts 241 and the fastening bolts 242 with each of the internal threads formed in the inner circumferential faces of the fastening holes 212*b*.

As illustrated in FIG. 6, the plurality of through holes 213*a* are arranged such that respective distances from the plurality of through holes 213*a* to the axis X are the same distance D3. The plurality of through holes 213*a* illustrated in FIG. 6 are arranged at 12 points at an interval of 30 degrees in the circumferential direction CD about the axis X. Note that the number of points at which the plurality of through holes 213*a* are arranged in the circumferential direction CD may be any number other than 12.

As illustrated in FIG. 6, the fastening bolts 242 are inserted at 4 out of 12 of the through holes 213*a*. The through holes 213*a* in which the fastening bolts 242 are inserted are arranged at 4 points at an interval of 90 degrees in the circumferential direction. On the other hand, the fastening bolts 241 having higher tensile strength than the fastening bolts 242 are inserted in 8 out of 12 of the through holes 213*a*. The fastening bolts 241 are inserted in other through holes 213*a* than the four through holes 213*a* in which the fastening bolts 242 are inserted.

Although the fastening bolts 242 are inserted at 4 out of 12 of the through holes 213*a* and the fastening bolts 41 are inserted at 8 out of 12 of the through holes 213*a* in the example illustrated in FIG. 6, other forms may be employed. For example, the number of through holes used for insertion of the fastening bolts 242 may be two or three, and the fastening bolts 241 may be inserted in the remaining through holes.

In such a case, it is preferable that the position at which the through holes 213*a* used for insertion of the fastening bolts 242 are arranged be positions symmetrical with respect to the axis X. Further, it is preferable that the positions at which the through holes 213*a* used for insertion of the fastening bolts 242 are arranged be positions at the same interval in the circumferential direction CD. Further, it is preferable that the number of fastening bolts 241 inserted in a plurality of through holes 213*a* be greater than the number of fastening bolts 242 inserted in a plurality of through holes 213*a*.

The bearing casing 220 is a member formed in an annular shape about the axis X and is arranged adjacent to the turbine casing 212 along the axis X. The bearing casing 220 is coupled to the turbine casing 212 by a coupling part 250.

As illustrated in FIG. 5, the coupling part 250 is to couple the turbine casing 212 and the bearing casing 220 to each other at a plurality of points at a position X4 on the axis X in the circumferential direction CD about the axis X. As illustrated in FIG. 7, the coupling part 250 has fastening bolts (first fastening bolt) 251 each formed in a shaft shape extending parallel to the axis X and fastening bolts (second fastening bolt) 252 each formed in a shaft shape extending parallel to the axis X. An external thread is formed in each outer circumferential face of the fastening bolts 251 and the fastening bolts 252.

The fastening bolts 251 and the fastening bolts 252 have the same length and the same outer diameter. However, the tensile strength of the fastening bolt 251 is higher than the tensile strength of the fastening bolt 252. It is desirable that that the tensile strength of the fastening bolt 251 have strength that can ensure safety so that, even when the impeller 211 is damaged and broken, the broken members do not scatter outside the supercharger 200.

It is desirable that the tensile strength of the fastening bolt 251 be higher than or equal to 1200 MPa ($N/mm^2$), for example. As a fastening bolt having tensile strength of 1200 MPa ($N/mm^2$) or higher, a 12G hot dip galvanizing high strength bolt "12G SHTB (registered trademark)" can be used, for example. Further, for example, a bolt formed of YAG300 (maraging steel) can be employed. It is more preferable that the yield strength of the fastening bolt 251 be higher than or equal to 1080 MPa ($N/mm^2$). It is desirable that the tensile strength of the fastening bolt 252 be strength at which a delayed fracture is less likely to occur, for example, be lower than or equal to 1100 MPa ($N/mm^2$).

In the bearing casing 220, a plurality of through holes 221 each extending parallel to the axis X are formed spaced apart from each other in the circumferential direction CD. Fastening holes 212*c* each extending parallel to the axis X are formed in the end face of the turbine casing 212 arranged facing the through holes 221. An internal thread is formed in each inner circumferential face of the fastening holes 212*c*.

The turbine casing 212 and the bearing casing 220 are coupled to each other with the plurality of fastening bolts 251 and the plurality of fastening bolts 252 being inserted in the plurality of through holes 221. The turbine casing 212 and the bearing casing 220 are coupled to each other by engaging each of the external threads formed in the outer circumferential faces of the fastening bolts 251 and the fastening bolts 252 with each of the internal threads formed in the inner circumferential faces of the fastening holes 212*c*.

As illustrated in FIG. 7, the plurality of through holes 221 are arranged such that respective distances from the plurality of through holes 221 to the axis X are the same distance D4. The plurality of through holes 221 illustrated in FIG. 7 are arranged at 12 points at an interval of 30 degrees in the circumferential direction CD about the axis X. Note that the number of points at which the plurality of through holes 221 are arranged in the circumferential direction CD may be any number other than 12.

As illustrated in FIG. 7, the fastening bolts 252 are inserted at 4 out of 12 of the through holes 221. The through holes 221 in which the fastening bolts 252 are inserted are arranged at 4 points at an interval of 90 degrees in the circumferential direction. On the other hand, the fastening bolts 251 having higher tensile strength than the fastening bolts 252 are inserted in 8 out of 12 of the through holes 221. The fastening bolts 251 are inserted in other through holes 221 than the four through holes 221 in which the fastening bolts 252 are inserted.

Although the fastening bolts 252 are inserted at 4 out of 12 of the through holes 221 and the fastening bolts 251 are inserted at 8 out of 12 of the through holes 221 in the example illustrated in FIG. 7, other forms may be employed. For example, the number of through holes used for insertion of the fastening bolts 252 may be four or three, and the fastening bolts 251 may be inserted in the remaining through holes.

In such a case, it is preferable that the position at which the through holes 221 used for insertion of the fastening bolts 252 are arranged be positions symmetrical with respect to the axis X. Further, it is preferable that the positions at which the through holes 221 used for insertion of the fastening bolts 252 are arranged be positions at the same interval in the circumferential direction CD. Further, it is preferable that the number of fastening bolts 251 inserted in a plurality of through holes 221 be greater than the number of fastening bolts 252 inserted in a plurality of through holes 221.

According to the present embodiment, in the supercharger 200 including the turbine casing 212 having the vortex chamber 212*a* that causes a gas to flow out, which is guided to the impeller 211, it is possible to suppress a failure due to a delayed fracture of a fastening bolt while enhancing safety so that, even when the impeller 211 accommodated inside is damaged and broken, the broken members do not scatter outside the device.

The rotary machine according to the present embodiment described above is understood as follows, for example.

The rotary machine (100, 200) according to the present disclosure includes: an impeller (11) coupled to a rotary shaft (30) configured to rotate about an axis (X); a first casing (13) arranged along the axis and formed in an annular shape so as to surround on an outer circumferential side of the impeller; a second casing (15*a*, 20) arranged adjacent to the first casing along the axis and formed in an annular shape; and a coupling part (40, 50) configured to couple the first casing and the second casing to each other at a plurality of points in a circumferential direction (CD) about the axis at a predetermined position (X1, X2) on the axis. The coupling part has at least one first fastening bolt (41, 51) formed in a shaft shape extending parallel to the axis and at least one second fastening bolt (42, 52) formed in a shaft shape extending parallel to the axis, a plurality of through holes (15*c*, 21) each extending parallel to the axis are formed spaced apart from each other in the circumferential direction in at least one of the first casing and the second casing, the first casing and the second casing are coupled to each other with a plurality of first fastening bolts and a plurality of second fastening bolts being inserted in the plurality of through holes, and the first fastening bolt has higher tensile strength than the second fastening bolt. For example, the tensile strength of the first fastening bolt is higher than or equal to 1200 MPa, and the tensile strength of the second fastening bolt is lower than or equal to 1100 MPa.

According to the rotary machine of the present disclosure, the coupling part that couples the first casing, which is formed in an annular shape so as to surround the outer circumferential side of the impeller, and the second casing, which is arranged adjacent to the first casing, to each other has the first fastening bolts and the second fastening bolts each formed in a shaft shape extending parallel to the axis. The first casing and the second casing are coupled to each other with a plurality of first fastening bolts and a plurality of second fastening bolts being inserted in the plurality of through holes.

According to the rotary machine of the present disclosure, the first fastening bolt has higher tensile strength than the second fastening bolt. Thus, compared to a case where only the second fastening bolts are used to couple the first casing and the second casing to each other, it is possible to increase the coupling strength of coupling between the first casing and the second casing and enhance safety so that, even when the impeller accommodated inside is damaged and broken, the broken members do not scatter outside the device.

Further, according to the rotary machine of the present disclosure, the second fastening bolt has lower tensile strength than the first fastening bolt. Thus, compared to a case where only the first fastening bolts are used to couple the first casing and the second casing to each other, it is possible to suppress a failure due to a delayed fracture of the fastening bolt. That is, even when the first fastening bolt is broken due to a delayed fracture, the state where the first casing and the second casing are coupled to each other can be maintained by the second fastening bolt.

The rotary machine according to the present disclosure may be configured such that the number of first fastening bolts inserted in the plurality of through holes is greater than the number of second fastening bolts inserted in the plurality of through holes.

According to the rotary machine of the present configuration, since the number of first fastening bolts having higher tensile strength than the second fastening bolt is greater than the number of second fastening bolts, it is possible to sufficiently enhance safety so that, even when the impeller accommodated inside is damaged and broken, the broken members do not scatter outside the device.

The rotary machine according to the present disclosure may be configured such that the plurality of through holes are arranged such that respective distances from the plurality of through holes to the axis are the same.

According to the rotary machine of the present configuration, since the plurality of through holes are arranged so as to have the same distance to the axis, the coupling strength between the first casing and the second casing at each position in the circumferential direction about the axis can be made even.

The rotary machine according to the present disclosure may be configured such that the first fastening bolt and the second fastening bolt have the same length and the same outer diameter.

According to the rotary machine of the present configuration, since the first fastening bolt and the second fastening bolt have the same length and the same outer diameter, it is possible to make the plurality of through holes have the same length and the same inner diameter. It is thus possible to reduce man-hour required for forming the plurality of through holes.

The rotary machine according to the present disclosure may be configured such that the first casing is a member forming a vortex chamber (13*d*) into which a fluid compressed by the impeller flows.

According to the rotary machine of the present configuration, in the rotary machine including the first casing having the vortex chamber into which a fluid compressed by the impeller flows, it is possible to suppress a failure due to a delayed fracture of a fastening bolt while enhancing safety so that, even when the impeller accommodated inside is damaged and broken, the broken members do not scatter outside the device.

The rotary machine according to the present disclosure may be configured such that the first casing is a member forming a vortex chamber (212*a*) that causes a fluid to flow out, and the fluid is guided to the impeller.

According to the rotary machine of the present configuration, in the rotary machine including the first casing having the vortex chamber that causes a fluid to flow out, which is guided to the impeller, it is possible to suppress a failure due to a delayed fracture of a fastening bolt while enhancing safety so that, even when the impeller accommodated inside is damaged and broken, the broken members do not scatter outside the device.

The method of repairing rotary machine according to the present embodiment described above is understood as follows, for example.

In the method of repairing rotary machine according to the present disclosure, the rotary machine includes an impeller coupled to a rotary shaft configured to rotate about an axis, a first casing arranged along the axis and formed in an annular shape so as to surround an outer circumferential side of the impeller, and a second casing arranged adjacent to the first casing along the axis and formed in an annular shape, and a plurality of through holes each extending parallel to the axis are formed spaced apart from each other in the circumferential direction in at least one of the first casing and the second casing. The method includes: a removal step (S101, S103) of removing at least one of a plurality of second fastening bolts that are inserted in the plurality of through hole and couple the first casing and the second casing to each other; and a coupling step (S102, S104) of inserting a first fastening bolt in the through hole from which the second fastening bolt was removed and coupling the first casing and the second casing to each other, and the first fastening bolt has higher tensile strength than the second fastening bolt.

According to the method of repairing rotary machine according to the present disclosure, in the removal step, at least one of the plurality of second fastening bolts that couple the first casing, which is formed in an annular shape so as to surround the outer circumferential side of the impeller, and the second casing, which is arranged adjacent to the first casing, to each other is removed. Then, in the coupling step, the first fastening bolt is inserted in the through hole from which the second fastening bolt was removed, and thereby the first casing and the second casing are coupled to each other.

According to the method of repairing rotary machine according to the present disclosure, the first fastening bolt has higher tensile strength than the second fastening bolt. Thus, compared to a case where only the second fastening bolts are used to couple the first casing and the second casing to each other, it is possible to increase coupling strength of coupling between the first casing and the second casing and enhance safety so that, even when the impeller accommodated inside is damaged and broken, the broken members do not scatter outside the device.

Further, according to the method of repairing rotary machine of the present disclosure, the second fastening bolt has lower tensile strength than the first fastening bolt. Thus, compared to a case where only the first fastening bolts are used to couple the first casing and the second casing to each other, it is possible to suppress a failure due to a delayed fracture of the fastening bolt. That is, even when the first fastening bolt is broken due to a delayed fracture, the state where the first casing and the second casing are coupled to each other can be maintained by the second fastening bolt.

REFERENCE SIGNS LIST

10 centrifugal compressor
11 impeller
13 scroll casing (first casing)
13*a*, 13*b* fastening hole
13*d* vortex chamber
15*a*, 15*b* silencer casing
15*c* through hole
20 bearing casing (second casing)
21 through hole
30 rotor shaft
40, 50 coupling part
41, 42, 51, 52 fastening bolt
100, 200 supercharger
210 turbine
211 impeller
212 turbine casing (first casing)
212*a* vortex chamber
212*b*, 212*c* fastening hole
213 outlet casing (second casing)
213*a* through hole
220 bearing casing (second casing)
221 through hole
230 rotor shaft
240, 250 coupling part
241, 242, 251, 252 fastening bolt
CD circumferential direction
X axis

The invention claimed is:

1. A rotary machine comprising:
an impeller coupled to a rotary shaft configured to rotate about an axis;
a first casing arranged along the axis and formed in an annular shape so as to surround an outer circumferential side of the impeller;
a second casing arranged adjacent to the first casing along the axis and formed in an annular shape; and
a coupling part configured to couple the first casing and the second casing to each other at a plurality of points in a circumferential direction about the axis at a predetermined position on the axis,
wherein the coupling part has at least one first fastening bolt formed in a shaft shape extending parallel to the axis and at least one second fastening bolt formed in a shaft shape extending parallel to the axis,
wherein a plurality of through holes each extending parallel to the axis are formed spaced apart from each other in the circumferential direction in the first casing and the second casing,
wherein the first casing and the second casing are coupled to each other with a plurality of the first fastening bolts and a plurality of the second fastening bolts being inserted in the plurality of through holes,
wherein each of the first fastening bolt has higher tensile strength than each of the second fastening bolt; and
wherein each of the first fastening bolt and each of the second fastening bolt have the same length and the same outer diameter.

2. The rotary machine according to claim 1,
wherein tensile strength of the first fastening bolt is higher than or equal to 1200 MPa, and
wherein tensile strength of the second fastening bolt is lower than or equal to 1100 MPa.

3. The rotary machine according to claim 1, wherein the number of first fastening bolts inserted in the plurality of through holes is greater than the number of second fastening bolts inserted in the plurality of through holes.

4. The rotary machine according to claim 1, wherein the plurality of through holes are arranged such that respective distances from the plurality of through holes to the axis are the same.

5. The rotary machine according to claim 1, wherein the first casing is a member forming a vortex chamber into which a fluid compressed by the impeller flows.

6. The rotary machine according to claim 1, wherein the first casing is a member forming a vortex chamber that causes a fluid to flow out, the fluid being guided to the impeller.

7. A method of repairing a rotary machine, wherein the rotary machine comprises:
an impeller coupled to a rotary shaft configured to rotate about an axis,
a first casing arranged along the axis and formed in an annular shape so as to surround an outer circumferential side of the impeller, and
a second casing arranged adjacent to the first casing along the axis and formed in an annular shape, wherein a plurality of through holes each extending parallel to the axis are formed spaced apart from each other in the circumferential direction about the axis in the first casing and the second casing, the method comprising:

a removal step of removing at least one and fewer than all of a plurality of second fastening bolts that are inserted in the plurality of through hole and couple the first casing and the second casing to each other;

a coupling step of inserting a first fastening bolt in the through hole from which the second fastening bolt was removed and coupling the first casing and the second casing to each other, wherein the first fastening bolt has higher tensile strength than the second fastening bolt; and wherein the first fastening bolt and the second fastening bolt have the same length and the same outer diameter.

* * * * *